Figure 1:
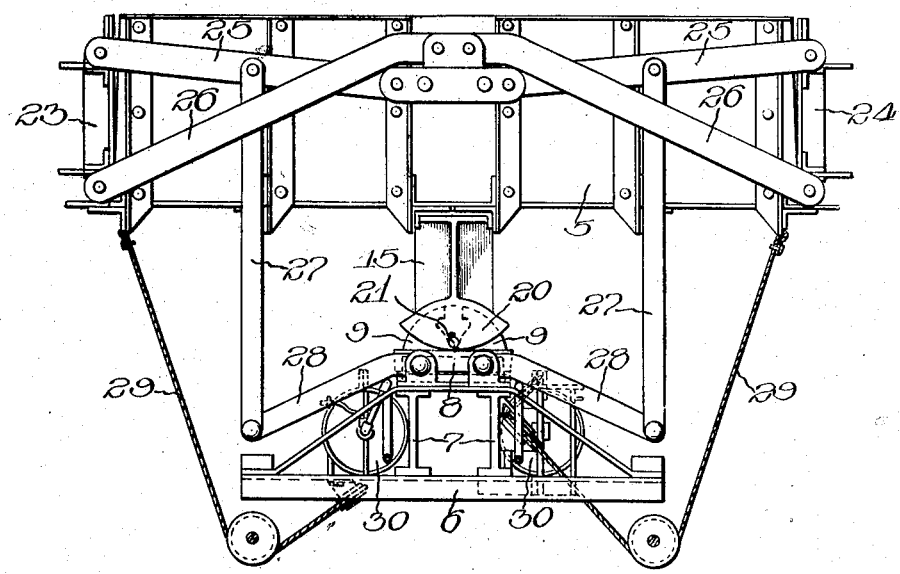

J. B. RHODES.
DUMP CAR.
APPLICATION FILED NOV. 12, 1908.

918,911.  Patented Apr. 20, 1909.

Witnesses:

Inventor:
Jay B. Rhodes,

UNITED STATES PATENT OFFICE.

JAY B. RHODES, OF KALAMAZOO, MICHIGAN, ASSIGNOR TO WESTERN WHEELED SCRAPER COMPANY, OF AURORA, ILLINOIS, A CORPORATION OF ILLINOIS.

DUMP-CAR.

No. 918,911.  Specification of Letters Patent.  Patented April 20, 1909.

Application filed November 12, 1908. Serial No. 462,289.

*To all whom it may concern:*

Be it known that I, JAY B. RHODES, a citizen of the United States, residing at Kalamazoo, in the county of Kalamazoo and State of Michigan, have invented certain new and useful Improvements in Dump-Cars, of which the following is a specification, reference being had to the accompanying drawings.

My invention relates to dump cars, and particularly to cars provided with movable side gates, in which provision is made for dumping the load at one or both sides of the track.

It has for its object to provide new and improved means for supporting the car-body so that it may be readily dumped at either side or restored to its normal position, and by which the car-body may be readily detached from the truck which carries it when in normal position but cannot be accidentally detached when dumping; also to provide a support for the car-body which will also act as a stop to limit the extent to which the car-body may be tilted at either side in dumping. I accomplish this object as illustrated in the drawings and as hereinafter described.

What I regard as new is set forth in the claims.

It will be understood that while my improved supporting devices are intended for use principally with cars provided with movable side gates arranged to be lifted to expose the side of the car at which the load is to be dumped, certain features of my invention may also be applied to other types of dump cars.

Figure 3:
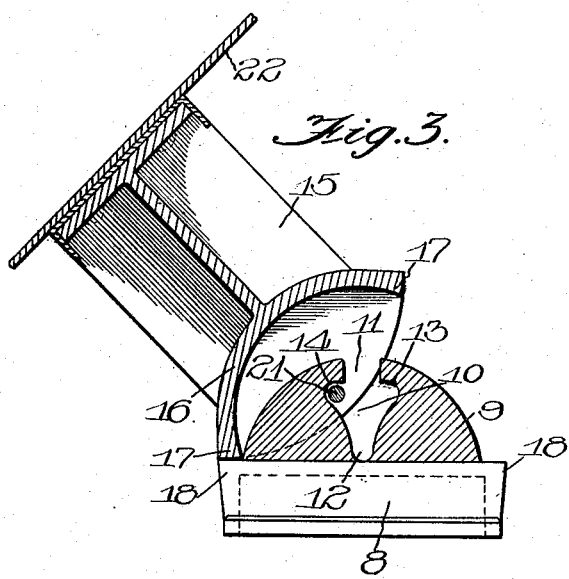
Figure 2:
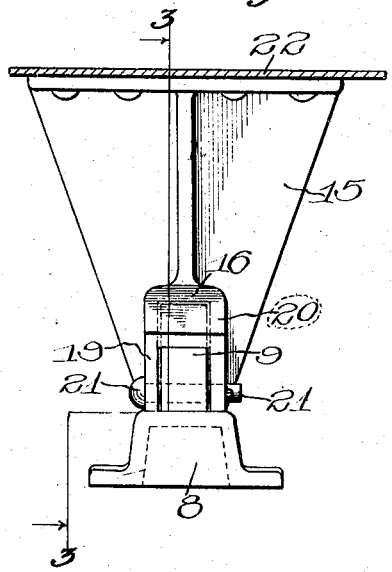

In the drawings,—Figure 1 is an end view of a car-body and a portion of the truck which supports it; Fig. 2 is an enlarged detail, being a side view of the car-body support; and Fig. 3 is a section on line 3—3 of Fig. 2.

Referring to the drawings,—5 indicates the car-body, and 6 the upper portion of the truck which carries it. It will be understood that the truck is mounted on the usual wheels, but for clearer illustration the greater part of the truck is omitted from the drawings, as the general construction and arrangement of such trucks is well understood in the art. Such a car, for instance, is illustrated in my pending application, Ser. No. 433,038, filed May 15, 1908.

As shown in Fig. 1, the upper portion of the truck, in the construction shown, is provided with longitudinal I-beams 7, on which are mounted the devices which immediately support the car-body. Such supporting devices comprise a bearing-block 8 which rests upon and is fixedly secured to the I-beams 7, one of such blocks being provided for each truck. Usually a car is provided with two trucks, both of which, however, are alike. On its upper side the bearing-block 8 carries a segmental bearing 9 which is arranged transversely of the truck and is provided with a triangular recess 10, said recess being open at the top, as shown at 11 in Fig. 3. Said recess 10 is substantially in the form of an inverted equilateral triangle, thus providing three corners 12—13—14, as best shown in Fig. 3.

15 indicates a rocking support in the form of a standard having at its lower end a concave bearing plate 16, which fits over, and, when the standard is in upright position, rests upon the bearing 9, as shown in Fig. 1. When the standard 15 is rocked to one side or the other, the end portions 17 of said plate 16 are adapted to engage projecting end portions 18 of the bearing-block 8, thereby forming end bearings which support the standard when in tilted position. The plate 16 is provided at its opposite sides with flanges 19—20 which project down at the sides of the bearing 9, as shown in Fig. 2, and have convex lower edges, as shown in Figs. 1 and 3,—said flanges forming rockers on which the standard swings to one side or the other. They also serve to prevent displacement of the standards in the direction of the length of the car.

21 indicates a pin or bolt, which passes through suitable holes in the flanges 19—20 and through the recess 10 in the bearing 9, as shown. The arrangement is such that when the standard 15 is in its vertical position the bolt 21 is at the lowermost point 12 of the recess 10, but when the standard 15 is rocked to one side or the other, the pin 21 moves up into one or the other of the corners 13—14. By this construction the car-body is carried out farther to one side or the other when tilted, and the engagement of the pin 21 with the corners 13 or 14 limits the extent to which the standard may be rocked and also prevents accidental disconnection of the standard with the bearing-block. The standard may readily be detached from the block 9 by simply lifting it vertically to carry the pin 21 through the slot 11. This is an important advantage, as frequently where a car is wrecked the pin is twisted or jammed so that it cannot readily be removed. Of course, where the parts are not damaged they may be disconnected by removing the pin 21.

At its upper end the standard 15 carries a plate 22 by which the car-body is secured to it. 23—24 indicate the side gates, which are connected with the car-body by straps 25—26. Said gates are held up out of operative position when the car-body is tilted at either side by bars 27 connected with the bearing-block 8 by straps 28, as shown in Fig. 1.

29 indicates cables for dumping the car at either side, said cables being operated in any suitable manner, as by compressed-air-operated cylinders 30. The mechanism for dumping the car, however, forms no part of my present invention and therefore will not be described further.

That which I claim as my invention, and desire to secure by Letters Patent, is,—

1. In a dump-car, the combination of a car-body, a rocker bearing for said car-body comprising an upper member and a lower member, said upper member being adapted to rock on said lower member to tilt the car-body, and having means engaging the lower member for preventing displacement of the upper member lengthwise of the car in either direction, one of said members having a recess, the other member having a pin moving in said recess and acting to limit the extent to which the upper member may be rocked laterally.

2. In a dump-car, the combination of a car-body, a rocker bearing for said car-body comprising an upper member and a lower member, said upper member being adapted to rock on said lower member to tilt the car-body, and having means engaging the lower member for preventing displacement of the upper member lengthwise of the car in either direction, one of said members having a triangular recess, the other member having a pin moving in said recess and acting to limit the extent to which the upper member may be rocked laterally in either direction.

3. In a dump-car, the combination of a car-body, a rocker bearing for said car-body comprising an upper member and a lower member, said upper member being adapted to rock on said lower member to tilt the car-body, one of said members having a recess, said recess being open at the top, the other member having a pin moving in said recess and acting to limit the extent to which the upper member may be rocked laterally.

4. In a dump-car, the combination of a car-body, a rocker bearing for said car-body comprising an upper member and a lower member, said upper member being adapted to rock on said lower member to tilt the car-body, one of said members having a triangular recess, said recess being open at the top, the other member having a pin moving in said recess and acting to limit the extent to which the upper member may be rocked laterally in either direction.

5. In a dump-car, the combination of a transversely-disposed lower segmental bearing having a recess therein, an upper segmental bearing overlying said recess and adapted to bear upon said lower bearing, a car-body mounted on said upper bearing, and a pin connected with said upper bearing and fitting within said recess, said pin being adapted to engage the lower bearing to limit the rocking movement of the upper bearing.

6. In a dump-car, the combination of a transversely-disposed lower segmental bearing having a recess therein, an upper segmental bearing overlying said recess and adapted to bear upon said lower bearing, a car-body mounted on said upper bearing, and a pin connected with said upper bearing and fitting within said recess, said pin being adapted to engage the lower bearing to limit the rocking movement of the upper bearing in either direction.

7. In a dump-car, the combination of a transversely-disposed lower segmental bearing having a triangular recess therein, an upper segmental bearing overlying said recess and adapted to bear upon said lower bearing, a car-body mounted on said upper bearing, and a pin connected with said upper bearing and fitting within said recess, said pin being adapted to engage the lower bearing to limit the rocking movement of the upper bearing in either direction.

8. In a dump-car, the combination of a lower segmental bearing having a recess, an upper bearing adapted to coöperate with said lower bearing and having one or more curved flanges which overlie said recess and on which said upper bearing rocks, and a pin carried by said upper bearing and lying within said recess for limiting the rocking movement of said upper bearing.

9. In a dump-car, the combination of a lower segmental bearing having a triangular recess, an upper bearing adapted to coöperate with said lower bearing and having one or more curved flanges which overlie said recess and on which said upper bearing rocks, and a pin carried by said upper bearing and lying within said recess for limiting the rocking movement of said upper bearing.

10. In a dump-car, the combination of a car-body, a rocking standard on which said car-body is mounted, said standard having a rocker bearing at its lower end, a bearing-block on which said rocker rests, said block having a slotted recess, a pin connected with said standard and fitted in said recess for limiting the rocking movement of said bearing and means for preventing displacement of the standard lengthwise of the car in either direction.

11. In a dump-car, the combination of a car-body, a rocking standard on which said car-body is mounted, said standard having a rocker bearing at its lower end, a bearing-block on which said rocker rests, said block having a triangular slotted recess, a pin connected with said standard and fitted in said recess for limiting the rocking movement of said bearing in either direction and means for preventing displacement of the standard lengthwise of the car.

12. In a dump-car, the combination of a car-body, a rocking standard on which said car-body is mounted, said standard having a rocker bearing at its lower end, a bearing-block on which said rocker rests, said block having a slotted recess, said recess being open at the top, and a pin connected with said standard and fitted in said recess for limiting the rocking movement of said bearing.

13. In a dump-car, the combination of a car-body, a rocking standard on which said car-body is mounted, said standard having a rocker bearing at its lower end, a bearing-block on which said rocker rests, said block having a triangular slotted recess, said recess being open at the top, and a pin connected with said standard and fitted in said recess for limiting the rocking movement of said bearing in either direction.

14. In a dump-car, the combination of a car-body having movable side-gates and one or more rocking supports on which the car-body is mounted, said supports each comprising an upper member and a lower member, said upper member being adapted to rock on said lower member to tilt the car-body, one of said members having a recess, the other member having a pin moving in said recess and acting to limit the extent to which the upper member may be rocked laterally, and means actuated by the tilting of the car-body for operating the appropriate gate to permit the load to be dumped.

15. In a dump-car, the combination of a car-body having movable side-gates, a rocker bearing for said car-body comprising an upper member and a lower member, said upper member being adapted to rock on said lower member to tilt the car-body, one of said members having a recess, said recess being open at the top, the other member having a pin moving in said recess and acting to limit the extent to which the upper member may be rocked laterally, and means actuated by the rocking of the car-body for operating the appropriate side-gate to permit the load to be dumped.

16. In a dump-car, the combination of a car-body, a rocker bearing for said car-body comprising an upper member and a lower member, said upper member being adapted to rock on said lower member to tilt the car-body, one of said members having a recess, said recess being open at the top, the other member having a pin moving in said recess and acting to limit the extent to which the upper member may be rocked laterally, and means for preventing displacement of said upper member in the direction of the length of the car.

JAY B. RHODES.

Witnesses:
MINNIE A. HUNTER,
JOHN L. JACKSON.